April 11, 1950     C. L. DAVIS     2,504,006
VALVE DEVICE
Filed Sept. 5, 1947

INVENTOR.
C. L. Davis,
BY
ATTORNEY

Patented Apr. 11, 1950

2,504,006

UNITED STATES PATENT OFFICE 2,504,006

VALVE DEVICE

Craig L. Davis, Catawissa, Pa.

Application September 5, 1947, Serial No. 772,264

5 Claims. (Cl. 251—16)

This invention relates to valve devices of the pivoted flap valve type, and has particular reference to a combination check, stop and drain valve device of this type.

There are many instances where it is desirable to employ a single valve device which may be used either as a check valve, a stop valve or a drain valve. Accordingly, the primary object of the present invention is to provide a valve device embodying simple, practical means whereby it may readily and easily be adapted to serve either as a check valve, a stop valve or a drain valve.

Other special and important objects of the invention are: to provide a valve device of the character stated embodying simple, practical, adjustable means for regulating the permissible amount of opening movement of the flap valve thereof when the device is used as a check valve; to provide a valve device as stated in which the flap valve thereof may swing to a fully open position with respect to the passageway which it controls to permit the free passage of a cleaning or other element through said passageway; to provide a valve device as stated embodying simple, practical means for securing the flap valve thereof in a partly open position for drainage purposes, and to provide a valve device as stated embodying both a compact construction which may readily and easily be produced at low cost.

With the foregoing and other objects in view, which will become more fully apparent as the nature of the invention is better understood, the same consists in a valve device embodying the novel features of construction, combination and arrangement of parts as will be hereinafter more fully described, illustrated in the accompanying drawings and defined in the appended claims.

In the accompanying drawings, wherein like characters of reference denote corresponding parts in the different views.

Figure 1:
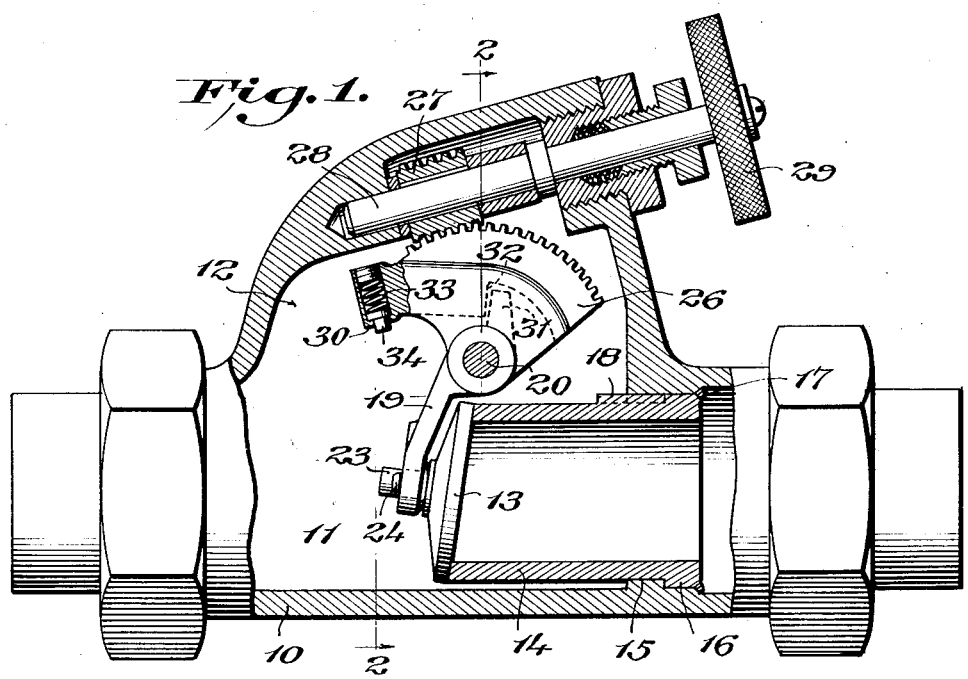
Fig. 1 is a central, vertical, longitudinal section through a valve device constructed in accordance with the invention and shown as adapted for use as a check valve.
Figure 2:
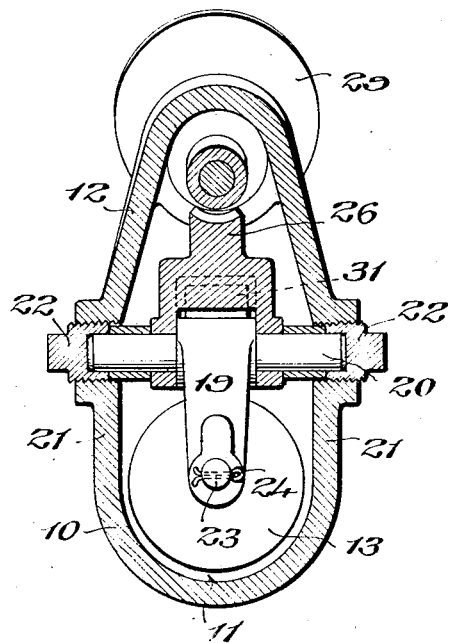
Fig. 2 is a transverse section on the line 2—2 of Fig. 1.

Referring to the drawings in detail, 10 designates, generally, the casing of the present valve device which, as shown, includes a straight, bottom passageway 11 to be controlled and, above said passageway, a housing 12 which opens at its bottom into said passageway and contains the control means for a flap valve 13 by which said passageway is controlled.

The flap valve 13 cooperates with a seat constituted by the inner end of a tube 14 which forms part of the passageway 11 and which may be either an integral part of the casing 10 or a part separate from said casing and mounted therein in any suitable manner. In this connection and as illustrated in the drawings, the tube 14 is separate from the casing 10, being formed, for example, from bronze, rustless steel or the like, whereas the casing 10 may be formed from less expensive metal. By way of example, one practical manner of mounting said tube in said casing is to provide said casing with an annular portion 15 having a bore to neatly receive said tube; to provide said tube with an annular, exterior flange 16 at its outer end to abut the portion 15 and thus definitely position the tube longitudinally relative to the casing; and to weld the tube at its outer end to the casing as indicated at 17. To insure correct positioning of the tube rotatably with respect to the casing before it is welded therein, the same may be provided with a key 18 to fit in a keyway in the casing portion 15. Alternatively, said tube may, for example, be threaded in said casing. In any event, when operatively mounted in said casing, said tube constitutes, to all intents and purposes, a fixed part of said casing.

The flap valve 13 is carried by the lower end of an arm 19 which, at its upper end, is mounted for swinging movement upon a shaft 20 which extends transversely of the casing 10 above the tube 15 and is suitably supported at its ends by the side walls 21 of the housing 11, as, for example, in bearing elements 22 threaded in said side walls.

To removably mount the flap valve on the lower end of the arm 19, said valve may be provided with a stem 23 to extend through a bore in the lower end of said arm, while to retain said stem in said bore a cotter pin 24 may extend through an opening in said stem at the side of said arm opposite which the valve is disposed.

Also mounted upon the shaft 20, for rotation independently of the arm 19, is a worm wheel sector 26 which straddles the hub of the arm 19 and thereby insures at all times an operative relationship between the same and said arm. Engaged with said sector is a worm 27 which is keyed or otherwise suitably fixed to a shaft 28 which is suitably journaled in the top portion of the housing 11 and suitably held against longitudinal movement therein and which has one end thereof extending exteriorly of said housing and provided with a hand wheel 29. Thus, by means of said hand wheel said shaft may be rotated to rotate said worm and thereby rotate the sector 26.

Figure 3:
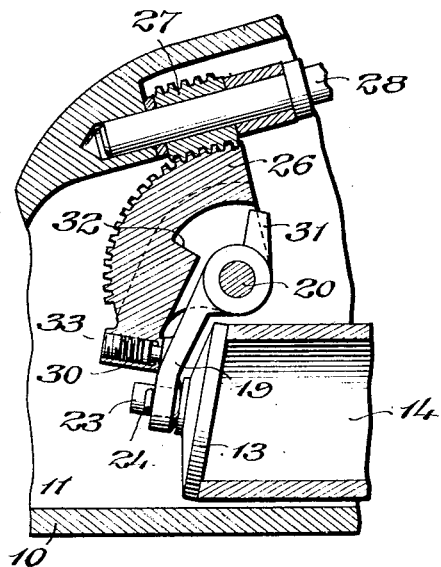
Fig. 3 is a fragmentary view similar to Fig. 1 showing the device as adapted to serve as a stop valve.

The sector 26 is provided with a stop formation 30 for cooperation with the side of the arm 19 opposite the side thereof at which the valve 13 is disposed. Accordingly, by rotatably adjusting said sector, said stop formation may be caused either to abut said arm when the valve 13 is closed to hold said valve positively closed, as shown in Fig. 3, or to be spaced variably from said arm when said valve is closed to regulate the permissible amount of opening movement of said valve. Of course, when said stop formation is spaced from said arm when the valve 13 is closed, said valve is operable as a check valve.

Projecting upwardly from the hub of the arm 19 is a lug 31, while formed as a part of the sector 26 is a cooperating lug 32. As shown, said lugs are disposed in the paths of rotation of each other and also in such relationship to each other that the lug 31 moves toward the lug 32 during closing movement of the valve 13.

When the valve 13 is closed and the sector 26 is in a position, as shown in Fig. 1, to permit said valve to swing to a fully open position entirely above the passageway 11, the lug 32 is disposed closely adjacent to, but not in contact with, the lug 31. Consequently, in said position of said sector, the valve is permitted to swing freely between fully open and closed positions without interference to its closing by the lugs 31 and 32. However, by rotating said sector from its said position in a direction corresponding to opening movement of the valve, the lug 32 will engage the lug 31 and as a consequence the valve 13 will be positively opened to permit, for example, drainage through the valve device.

The sector 26 will, of course, be held by the worm 27 in any position of rotation thereof to which it may be adjusted by said worm. Consequently, no manipulation of any part of the valve device, other than the hand wheel 29, is required to effect and maintain any desired adjustment of the device.

To cushion opening movements of the valve 13 when the latter acts as a check valve, the stop formation 30 may be hollow and may contain a spring 33 which acts to urge a button 34 beyond the end of said stop formation which is engageable by the arm 19. Accordingly, when the valve 13 swings open, the arm 19 will engage the spring-pressed button 34 and be required to depress the same before being brought to a positive stop by said stop formation 30, with the result that opening of the valve will be cushioned.

Summarizing, it will be apparent that the present valve device not only is of simple, practical, compact design, but may readily be made effective, simply by manipulation of the hand wheel 29, to serve either as a check valve, a stop valve or a drain valve. It will further be apparent that when said device is adapted to serve as a check valve, the permissible amount of its opening movement may be varied to suit particular conditions of its use. Moreover, it will be apparent that due to the passageway 11 being straight and to the valve 13 being swingable entirely above said passageway, a tool or implement of any kind for cleaning or any other purpose may be passed freely through said passageway.

Without further description it is believed that the construction and mode of operation of the present valve device will be clearly understood and its advantages appreciated. It is desired to point out, however, that while only a single, specific structure embodiment of the device has been illustrated and described, the same is readily capable of specifically different structural embodiments within the spirit and scope of the invention as defined in the appended claims.

I claim:

1. A valve device comprising a pivoted flap valve, a stop device pivoted coaxially with respect to said flap valve to swing with respect to the latter, and means for pivotally adjusting said stop device to secure said flap valve closed and to variably predetermine the permissible amount of opening movement thereof.

2. A valve device comprising a pivoted flap valve, a member pivoted to swing with respect to said flap valve, stop means on said member effective in one position of swinging adjustment thereof to secure said flap valve positively closed and in other positions of swinging adjustment thereof to variably predetermine the permissible amount of opening movement of said flap valve, means whereby said member in another position of swinging adjustment thereof is effective to secure said flap valve positively open, and means for swingably adjusting said member to and holding it in said positions of adjustment thereof.

3. A valve device comprising a flap valve, a pivoted arm by which said flap valve is carried for swinging movement between closed and open positions, a member pivoted to swing with respect to said arm, a stop formation on said member effective in one position of swinging adjustment of said member to cooperate with said arm to secure said flap valve positively closed and in other positions of swinging adjustment of said member to cooperate with said arm to variably predetermine the permissible amount of opening movement of said flap valve, cooperating lugs on said member and said arm effective in another position of swinging adjustment of said arm to hold said flap valve positively open, and means for swingably adjusting said member to and holding it in said positions of adjustment thereof.

4. A valve device comprising a casing having a passageway to be controlled, a shaft extending transversely of said casing, an arm mounted at one end upon said shaft for swinging movement, a flap valve carried by said arm at the other end thereof for controlling said passageway, a worm wheel sector mounted on said shaft for swinging movement independently of said arm, a worm for swinging said arm and holding it in different positions of swinging adjustment thereof, a stop formation on said sector effective in one position of adjustment of the latter to engage said arm and hold said valve positively closed, said sector being adjustable to a position in which said stop formation is spaced a distance from said arm to permit said valve to swing to a fully open position with respect to said passageway, and cooperating lugs on said arm and said sector effective in another position of swinging adjustment of the latter to hold said flap valve positively open.

5. A valve device as set forth in claim 2 in which the stop means includes a spring pressed element to cushion opening of the flap valve.

CRAIG L. DAVIS.

REFERENCES CITED

The following references are of record in the file of this patent:

UNITED STATES PATENTS

| Number | Name | Date |
| --- | --- | --- |
| 606,053 | Dehnel | June 21, 1898 |
| 743,745 | McElroy | Nov. 10, 1903 |
| 892,155 | Hodges | June 30, 1908 |
| 961,738 | Stickel | June 14, 1910 |
| 1,112,135 | Harkom | Sept. 29, 1914 |

FOREIGN PATENTS

| Number | Country | Date |
| --- | --- | --- |
| 2,490 | Great Britain | of 1906 |